(12) United States Patent
Hoogeveen et al.

(10) Patent No.: US 10,040,555 B2
(45) Date of Patent: Aug. 7, 2018

(54) CARGO BAY CATERING CONTAINER WITH A DISTRIBUTION SYSTEM

(71) Applicant: Driessen Aerospace Group N.V., Alkmaar (NL)

(72) Inventors: Andreas Hoogeveen, Enkhuizen (NL); Adriaan Eijkelenboom, Schoonhoven (NL); Cyril Morozeau, Colomiers (FR); Lucas Nastase, Lahnau (DE)

(73) Assignee: Driessen Aerospace Group N.V., Alkmaar (NL)

( * ) Notice: Subject to any disclaimer, the term of this patent is extended or adjusted under 35 U.S.C. 154(b) by 828 days.

(21) Appl. No.: 14/384,627

(22) PCT Filed: Mar. 13, 2013

(86) PCT No.: PCT/IB2013/051998
§ 371 (c)(1),
(2) Date: Sep. 11, 2014

(87) PCT Pub. No.: WO2013/136282
PCT Pub. Date: Sep. 19, 2013

(65) Prior Publication Data
US 2015/0028157 A1    Jan. 29, 2015

Related U.S. Application Data

(60) Provisional application No. 61/734,645, filed on Dec. 7, 2012, provisional application No. 61/670,232, filed (Continued)

(51) Int. Cl.
*B64D 11/04* (2006.01)
*B64D 11/00* (2006.01)
(Continued)

(52) U.S. Cl.
CPC .......... *B64D 11/04* (2013.01); *B64D 11/0007* (2013.01); *B66B 9/00* (2013.01);
(Continued)

(58) Field of Classification Search
CPC ..... B64D 11/04; B64D 11/0007; Y02T 90/32; Y02T 90/36; Y02T 50/46
See application file for complete search history.

(56) References Cited

U.S. PATENT DOCUMENTS 5,074,496 A * 12/1991 Rezag .................. B65G 1/0407
                                                           105/327
5,205,515 A *  4/1993 Luria .................. B64D 11/0007
                                                           186/40
(Continued)

FOREIGN PATENT DOCUMENTS

CA          2700658 A1    4/2009
DE        10204892 A1    8/2003
(Continued)

OTHER PUBLICATIONS

PCT/IB2013/051998, International Preliminary Report on Patentability dated Sep. 25, 2014, 8 pages.
(Continued)

*Primary Examiner* — Brian M O'Hara
*Assistant Examiner* — Keith L Dixon
(74) *Attorney, Agent, or Firm* — Kilpatrick Townsend & Stockton LLP; Dean W. Russell; Kristin M. Crall

(57) ABSTRACT

In a craft such as a passenger aircraft, an apparatus is provided for storing and retrieving service trolleys (110) in a craft having a passenger deck (150) and a cargo bay. The apparatus can comprise a container (101) located in the cargo bay (100) and configured to hold at least one service trolley (110). The apparatus can also comprise a pillar (102) located on the passenger deck, and the pillar can be config-
(Continued)

ured to receive at least one service trolley. The apparatus can also comprise a lift (103) configured to move the at least one service trolley between the container and the pillar. The apparatus can use the electricity, heat, and by-products from an integrated fuel cell system (106) to power a trolley distribution system and fulfill catering purposes, like heating and cooling.

16 Claims, 6 Drawing Sheets

Related U.S. Application Data on Jul. 11, 2012, provisional application No. 61/663,782, filed on Jun. 25, 2012, provisional application No. 61/610,025, filed on Mar. 13, 2012.

(51) Int. Cl.
| | | |
|---|---|---|
| B66B 9/00 | (2006.01) | |
| H01M 8/04119 | (2016.01) | |
| B64D 13/06 | (2006.01) | |
| B64D 41/00 | (2006.01) | |

(52) U.S. Cl.
CPC . *H01M 8/04156* (2013.01); *B64D 2013/0629* (2013.01); *B64D 2041/005* (2013.01); *H01M 2250/20* (2013.01); *Y02T 50/46* (2013.01); *Y02T 90/32* (2013.01); *Y02T 90/36* (2013.01)

(56) References Cited

U.S. PATENT DOCUMENTS

| | | | | |
|---|---|---|---|---|
| 5,314,143 | A * | 5/1994 | Luria | B64D 11/0007 |
| | | | | 104/88.01 |
| 5,322,244 | A * | 6/1994 | Dallmann | B64D 11/04 |
| | | | | 244/118.1 |
| 6,152,287 | A * | 11/2000 | Luria | B64D 9/00 |
| | | | | 198/465.1 |
| 7,494,091 | B2 * | 2/2009 | Harrington | B64D 11/0007 |
| | | | | 212/312 |
| 7,954,753 | B2 * | 6/2011 | Hoffjann | B64D 11/02 |
| | | | | 244/53 R |
| 8,141,185 | B2 | 3/2012 | Hoffjann et al. | |
| 8,519,824 | B1 * | 8/2013 | Rankin | B64D 11/00 |
| | | | | 244/118.5 |
| 8,686,876 | B2 * | 4/2014 | Shiomori | B64D 11/0015 |
| | | | | 244/117 R |
| 8,814,086 | B2 * | 8/2014 | Tran | B64D 11/04 |
| | | | | 244/118.5 |
| 9,475,580 | B2 * | 10/2016 | Lange | B65D 88/14 |
| 2004/0043276 | A1 | 3/2004 | Hoffjann et al. | |
| 2004/0057177 | A1 | 3/2004 | Glahn et al. | |
| 2006/0138278 | A1 | 6/2006 | Gans | |
| 2007/0172707 | A1 | 7/2007 | Hoffjann et al. | |
| 2008/0001026 | A1 | 1/2008 | Hoffjann et al. | |
| 2008/0038597 | A1 | 2/2008 | Hoffjann et al. | |
| 2008/0133076 | A1 | 6/2008 | Formanski et al. | |
| 2010/0221642 | A1 | 9/2010 | Frahm et al. | |
| 2013/0210329 | A1 | 8/2013 | God et al. | |

FOREIGN PATENT DOCUMENTS

| | | |
|---|---|---|
| DE | 102006042300 B4 | 9/2008 |
| DE | 102007054291 A1 | 4/2009 |
| DE | 102010033568 A1 | 2/2012 |
| EP | 2213571 B1 | 8/2010 |
| WO | 2006058774 A2 | 6/2006 |
| WO | 2007039211 A1 | 4/2007 |
| WO | 2007057188 A1 | 5/2007 |
| WO | 2011089016 A2 | 7/2011 |

OTHER PUBLICATIONS

PCT/IB2013/051998, Search Report and Written Opinion dated Sep. 5, 2013, 12 pages.

\* cited by examiner

CARGO BAY CATERING CONTAINER WITH A DISTRIBUTION SYSTEM

CROSS REFERENCES TO RELATED APPLICATIONS

This application is the U.S. national phase of International Application No. PCT/IB2013/051998, entitled "CARGO BAY CATERING CONTAINER WITH A DISTRIBUTION SYSTEM," filed Mar. 13, 2013 which claims the benefit of U.S. Provisional Application No. 61/610,025, entitled "IDEAS USING A FC (FUEL CELL) FOR GALLEYS, LAVATORIES AND TOILET SYSTEM," filed Mar. 13, 2012; U.S. Provisional Application No. 61/663,782, entitled "GALLEY INNOVATIONS," filed Jun. 25, 2012; U.S. Provisional Application No. 61/670,232, entitled "GALLEY INNOVATIONS (2)," filed Jul. 11, 2012; and U.S. Provisional Application No. 61/734,645, entitled "GALLEY AND LAVATORY AND OTHER POWER CONSUMER(S) POWERED BY A FUEL CELL," filed Dec. 7, 2012. The entire disclosure of each is hereby incorporated herein by reference.

BACKGROUND OF THE INVENTION

A number of components on-board an aircraft require electrical power for their activation. Many of these components are separate from the electrical components that are actually required to run the aircraft (i.e., the navigation system, fuel gauges, flight controls, and hydraulic systems). For example, aircraft also have catering equipment, heating/cooling systems, lavatories, power seats, water heaters, and other components that require power as well. Specific components that may require external power include but are not limited to trash compactors (in galley and/or lavatory), ovens and warming compartments (e.g., steam ovens, convection ovens, bun warmers), optional dish washer, freezer, refrigerator, coffee and espresso makers, water heaters (for tea), air chillers and chilled compartments, galley waste disposal, heated or cooled bar carts/trolleys, surface cleaning, area heaters, cabin ventilation, independent ventilation, area or spot lights (e.g., cabin lights and/or reading lights for passenger seats), water supply, water line heating to prevent freezing, charging stations for passenger electronics, electrical sockets, vacuum generators, vacuum toilet assemblies, grey water interface valves, power seats (e.g., especially for business or first class seats), passenger entertainment units, emergency lighting, and combinations thereof. These components are important for passenger comfort and satisfaction, and many components are absolute necessities.

However, one concern with these components is their energy consumption. As discussed, galley systems for heating and cooling are among several other systems aboard the craft which simultaneously require power. Frequently, such systems require more power than can be drawn from the aircraft engines' drive generators, necessitating additional power sources, such as a kerosene-burning auxiliary power unit (APU) (or by a ground power unit if the aircraft is not yet in flight). This power consumption can be rather large, particularly for long flights with hundreds of passengers. Additionally, use of aircraft power produces noise and $CO_2$ emissions, both of which are desirably reduced. Accordingly, it is desirable to identify ways to improve fuel efficiency and power management by providing innovative ways to power these components.

Galleys and lavatories are connected to the aircraft potable water tank, and water is required for many of the related on-board services. Water pipes connect the water tank to the water consumers. For example, coffee cannot be made, passengers cannot use the lavatories, hand-washing water is not provided, and so forth, until the the APU or electrical switch is on in order to allow water to flow. Some examples of the water consumers on-board aircraft are the steam oven, beverage maker (coffee/espresso/tea), water boiler, tap water supply, dish washer, and the toilet vacuum system. Aircraft typically carry large amounts of potable water in the potable water tanks, which is uploaded when the aircraft is on the ground. A number of water saving attempts have been made to help re-use certain types of water onboard aircraft, but it is still desirable to generate new ways to generate and/or re-use water on-board aircraft. Other systems use heat, which is also typically generated by separate units. For example, heated water is desirable for use in warming hand-washing water (and to prevent freezing of the water pipes), the ovens and warmers onboard require heat, as well as the cabin heating units.

The present inventors have thus sought new ways to generate power to run on-board components, as well as to harness beneficial by-products of that power generation for other uses on-board passenger transport vehicles, such as aircraft.

The relatively new technology of fuel cells provides a promising cleaner and quieter means to supplement energy sources already aboard aircrafts. A fuel cell has several outputs in addition to electrical power, and these other outputs often are not utilized. Fuel cell systems combine a fuel source of compressed hydrogen with oxygen in the air to produce electrical and thermal power as a main product. Water and Oxygen Depleted Air (ODA) are produced as by-products, which are far less harmful than $CO_2$ emissions from current aircraft power generation processes.

Turning from this broad overview of aircraft systems as a whole in order to further address details of a specific component, one particular aircraft component of interest is trolleys. In commercial passenger crafts, and particularly in passenger aircrafts, trolleys are often used by the cabin crew to serve refreshments of food and drinks to the passengers. One way to utilize the trolleys for this purpose would be to store the refreshments in a central repository on the craft before embarkation and then transfer the refreshments to the trolleys for distribution to the passengers. However, to save space aboard the craft and improve efficiency of the cabin crew, the refreshments are usually pre-loaded into the trolleys before the flight or voyage. The trolleys are then stored in or nearby the galley, where any needed further preparations to the refreshments may be completed during the trip.

Often the refreshments are to be served either heated or chilled. This can cause several issues in addition to the energy consumption concerns discussed above. For chilled items, the fact that the refreshments are pre-loaded onto the trolley normally requires the entire trolley to be placed in a chilled compartment. This limits the flexibility of the galley and the trolley because a trolley that needs to be chilled must be stored in a location with a chiller facility. In current galleys, the chiller installation also causes additional noise, which is inconvenient for the passengers directly next to the galley.

For heated refreshments, the items generally must first be taken out of a chilled trolley, then put in a steam oven or other warming apparatus, and finally placed back into a trolley after being heated. This transferring, waiting for warming to finish, and transferring again consumes substantial amounts of the cabin crew's time to prepare meals during the voyage.

Additionally, galleys are bulky monuments, requiring a substantial amount of room aboard a craft. Their common location near the front of an aircraft cabin frequently necessitates that all passengers must walk through the galley while boarding the craft. This is problematic because the galley is intended for cabin crew use only and ideally should be maintained as a restricted area. Furthermore, it presents a bottle neck that impedes quick boarding.

BRIEF SUMMARY OF THE INVENTION

Accordingly, disclosed herein are improvements to galleys over the drawbacks and limitations of existing galleys. The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

As an example embodiment, an apparatus is provided for storing and retrieving service trolleys in a craft having a passenger deck and a cargo bay. The apparatus can comprise a container located in the cargo bay and configured to hold at least one service trolley. The apparatus can also comprise a pillar located on the passenger deck, and the pillar can be configured to receive at least one service trolley. The apparatus can also comprise a lift configured to move the at least one service trolley between the container and the pillar and a power source configurable to operate independently of other power sources on the craft.

In embodiments, the apparatus further comprises a distribution system. The distribution system can be configured for selecting at least one trolley from a plurality of trolleys located in the container, and it can be operable to orient the selected at least one trolley for movement by the lift from the container to the pillar. The distribution system can be further operable to control the lift.

In embodiments, the distribution system comprises a computer. The computer comprises a processor and a computer readable medium comprising instructions executable by the processor. The instructions comprise a distribution module, and the instructions are executable by the processor for selecting at least one trolley from a plurality of trolleys located in the container and orienting the selected at least one trolley for movement by the lift from the container to the pillar. The instructions can be further executable by the processor for selecting a sequence for retrieving a subset of the plurality of trolleys based at least in part on a set of meal allocations for a set of passengers and a set of seat assignments for the set of passengers.

In embodiments, the container comprises at least one trolley storing position. Each trolley storing position is configured to receive a trolley. Each trolley storing position can be configured to at least one of provide power or recharge a power source. When a trolley storing position provides power, it provides power to at least one of a heating module for heating contents of the trolley and a cooling module for cooling contents of the trolley. When a trolley storing position recharges a power source, the power source is operable to power at least one of a heating module for heating contents of the trolley and a cooling module for cooling contents of the trolley.

In embodiments, the container comprises at least one of the following: a heating compartment for storing trolleys containing contents to be heated; a cooling compartment for storing trolleys containing contents to be cooled; a dry compartment for storing trolleys containing contents to be kept dry; and a fuel compartment for storing fuel for a power source of the apparatus. Each such heating compartment comprises at least one heating module configurable for heating contents of at least one trolley, and each such cooling compartment comprises at least one cooling module configurable for cooling contents of at least one trolley.

In embodiments, the apparatus for storing and retrieving service trolleys further comprises a power source, and the power source is at least one of a fuel cell system, a battery system, and a power system of the craft. In some embodiments, the power source is a fuel cell system, and electricity, heat, and at least one by-product from the fuel cell system is used for powering a trolley distribution system and fulfilling catering purposes of at least one of heating and cooling.

In some embodiments, the power source is a fuel cell system and the fuel cell system does at least one of the following: produces electricity, produces heat, and produces water. When the fuel cell system produces electricity, the electricity can be used to power at least one of at least one heating module, at least one cooling module, the lift, and a selection system. Such a selection system can be configured for selecting at least one trolley from a plurality of trolleys located in the container and/or operable to orient the selected at least one trolley for movement by the lift from the container to the pillar. When the fuel cell system produces heat, the heat can be used for at least one of at least one heating module and at least one plumbing pipe of the craft. When the fuel cell system produces water, the water can be used in at least one lavatory of the craft. Such water can also be used in the galley or for any other water supply. The fuel cell system water can be potable if it is treated.

In embodiments, the container further comprises fuel storage for the fuel cell system. The fuel storage can be configured for gaseous, liquid, and/or solid fuel depending on the needs of the particular fuel cell system. The fuel storage for the fuel cell system can be configured to distribute fuel to other fuel cell systems in the craft. The container can be configured so that at least one trolley having at least one fuel cartridge can be connected to refill the fuel storage for the fuel cell system from the at least one fuel cartridge when the at least one trolley is in stowage. The apparatus for storing and retrieving service trolleys can further comprise at least one trolley having at least one fuel cartridge connectable to refill the fuel storage for the fuel cell system when the at least one trolley is in stowage.

In embodiments, the pillar comprises at least one of a work-desk, a spigot, a sink, a trash compactor, and storage for safety demonstration gear.

In embodiments, the container is configurable for removal from the cargo bay between voyages of the craft. The container can also comprise the pillar and the lift, and the pillar can be configurable for refraction from the passenger deck into the container for removal of the container between voyages.

As an example embodiment, a method is provided for storing and retrieving service trolleys in a craft having a passenger deck and a cargo bay. The method can include storing at least one service trolley in a container located in the cargo bay and moving the at least one service trolley from the container to the passenger deck.

For a fuller understanding of the nature and advantages of the present invention, reference should be made to the ensuing detailed description and accompanying drawings.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

In embodiments, food storage is located in a cargo bay container, along with equipment for food chilling and warming functions. The container may be a fixed part in the cargo bay or may be a mobile standard container removable from the cargo bay. Food preparation devices, means and appliances can also be located in the cargo bay container. In embodiments, when food is to be served, food and food preparation devices, means, and appliances are lifted up in a pillar monument automatically from the cargo bay to the cabin where the food may be served to the passengers by the cabin crew.

Today, no system exists for preparing and distributing food and trolleys to, from, and within a cargo bay catering container reached and controlled from the passenger deck. Instead, as described in the background section, the crew members currently prepare the food on the passenger deck in a galley and generally store the trolleys there as well. The galley consumes space and could be seen by the passengers as a visual disturbance. By removing the galley from the passenger deck and locating food storage and preparation equipment in the cargo bay, extra floor space can be made available, which can be used for extra seats, translating to additional paying customers. Additionally, locating potentially noisy chilling and food preparation equipment in the cargo bay can eliminate that noise from the passenger deck.

Figure 1:
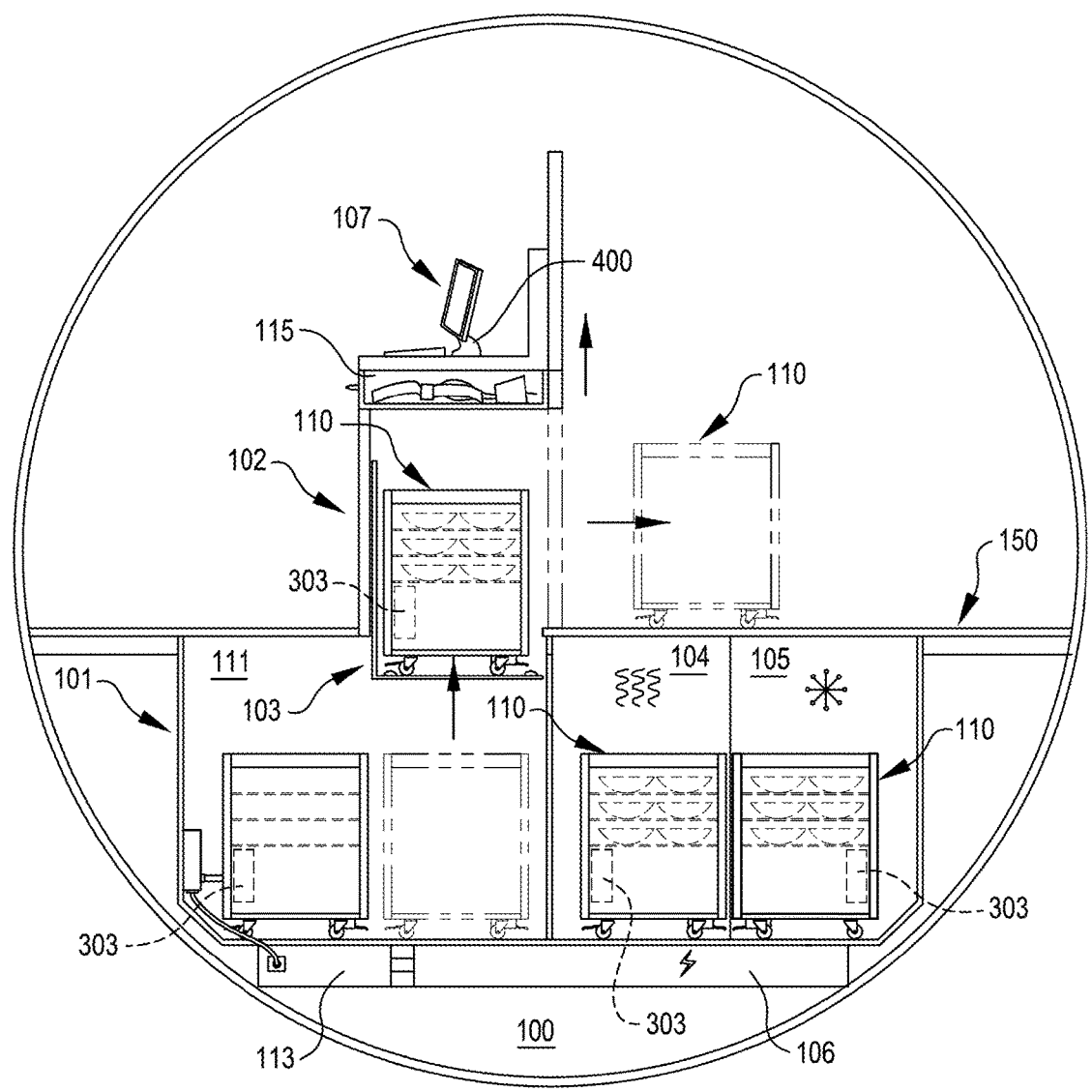
FIG. 1 shows a lower deck catering container with heating and cooling compartments for trolleys and a lifting device to transport the trolleys to the upper deck in accordance with embodiments.

Referring now to the drawings, in which like reference numerals represent like parts throughout the several views, FIG. 1 shows a lower deck catering container 101 with heating compartment 104 and cooling compartment 105 for trolleys 110 and a lifting device 103 to transport the trolleys 110 to the upper deck 150 in accordance with embodiments. Lower deck catering container 101 is located in cargo bay 100.

Figure 2:
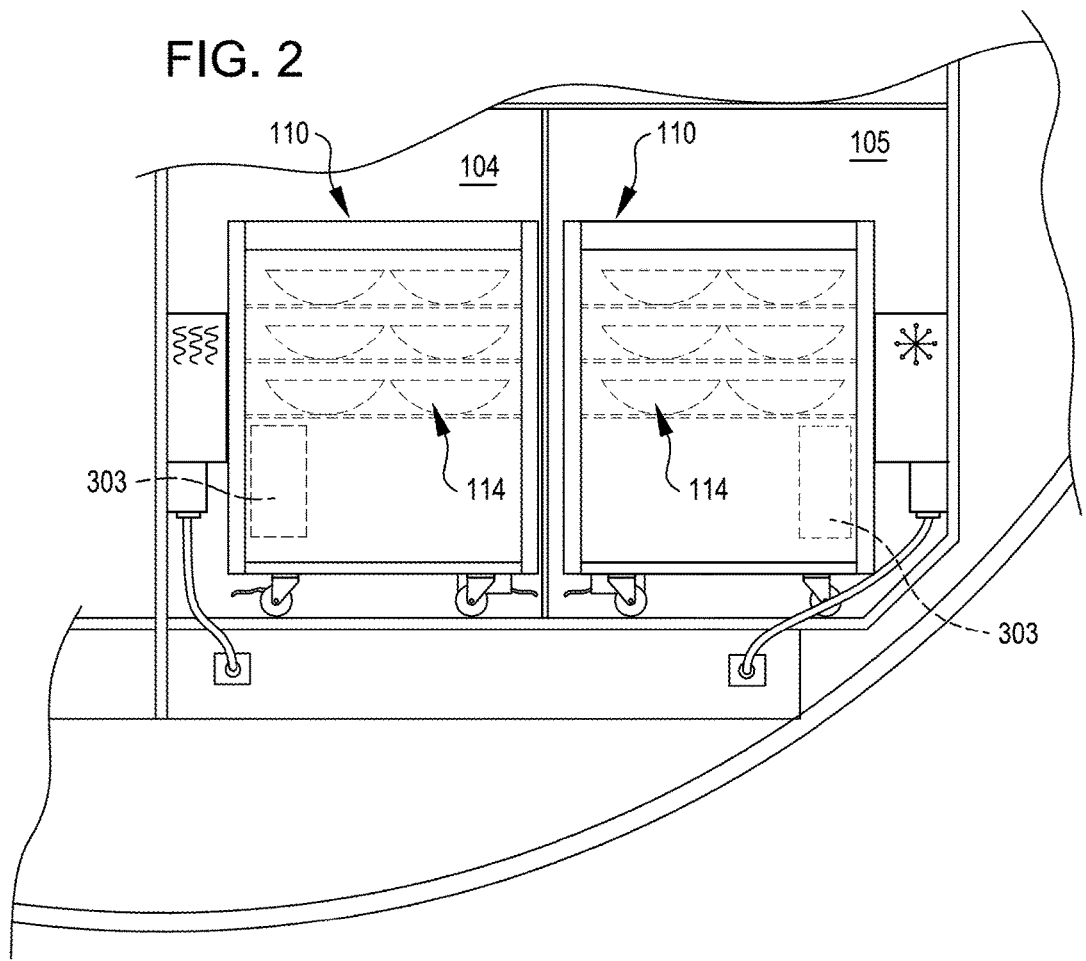
FIG. 2 shows a detail view of heating and cooling compartments of FIG. 1 in accordance with various embodiments.

FIG. 2 shows a detail view of heating and cooling compartments of FIG. 1 in accordance with various embodiments. In embodiments, trolleys 110 with contents that are to be served hot can be placed in heating compartment 104. Heating compartment 104 can be configured to heat such contents 114 to an appropriate temperature so that they may be served. This may be by raising a temperature of contents 114 to cook or reheat them, or by maintaining a temperature of contents 114 to keep them appropriately warm. Similarly, in embodiments, trolleys 110 with contents 114 that are to be chilled can be placed in cooling compartment 105. Cooling compartment 105 can be configured to chill such contents 114 to an appropriate temperature so that they may be served cold or maintained in a chilled state until reheated or cooked for distribution. This may be by lowering a temperature of the contents 114 or by maintaining a temperature for contents 114 that are already chilled. Thus, in embodiments, either or both of heating compartment 104 and chilling compartment 105 can be configured for adjustable heating or cooling, respectively. Adjustments can be controlled by the cabin crew, and/or adjustments can be performed automatically according to a computer system. As shown in FIG. 1, in embodiments, the container has a storage compartment 111 for trolleys 110 that do not need heating or chilling. In various embodiments, foldable trolleys may also be used, providing additional space for meal waste or other storage inside the cargo bay catering container.

As shown in FIG. 1, in embodiments, the catering container 101 includes a distribution system 107 by which the trolleys 110 can be transported between any of heating compartment 104, cooling compartment 105, storage compartment 111, and/or passenger deck 150. In various embodiments, distribution system 107 operates to move trolleys 110 from compartments 104, 105, and 111 within container 101 to the lifting system 103. In some embodiments, the lifting system 103 is also controlled by the distribution system; in some embodiments, the lifting system 103 can be operated independently of the distribution system 107. Distribution system 107 can include a computer system 400, which may be programed to determine the appropriate order of retrieval of trolleys 110 based upon passenger seat location and predetermined meal choice.

In current galleys, although food preparation has already been reduced to unpacking, heating, and distributing the meals to the passengers, food preparation still results in a high workload for the crew members, as the food has to be taken out of the trolley, unpacked, put in the ovens, and put back in the trolley after heating for distribution to the passengers. A catering container 101 with an integrated heating capability 104 and distribution system 107, as in various embodiments, may significantly reduce the food handling time and effort required by the crew members. This is in part because the heating capability 104 may be activated in the container 101 prior to the trolley 110 distribution, which eliminates the need for unloading and reloading the trolley 110 for heating its contents 114. This is also in part because the order of trolleys determined by the distribution system 107 may improve the efficiency of the food distribution performed by the cabin crew.

In various embodiments, the catering container 101 has a power source 106 for providing the power necessary to heat heating compartment 104, to cool cooling compartment 105, to power lifting device 103, and to power distribution system 107. In some embodiments power source 106 is integrated with the container 101; in some embodiments power source 106 is integrated with the aircraft but can still power the systems of container 101. In embodiments, power source 106 is a fuel cell system. In some embodiments, at least one by-product of the fuel cell system is used in systems on the aircraft. For example, the by-product of thermal energy (heat) may be harnessed to heat heating compartment 104 in conjunction with or instead of utilizing the electricity produced by the fuel cell system 106 to generate heat. Fuel cell system by-products may also be used in a variety of other ways, such as heat for heating lavatory pipes, water for lavatory use, and ODA for catering container sterilization purposes.

In some embodiments, fuel storage 113 for the fuel cell system 106 can be integrated in the catering container 101. In some embodiments, fuel storage 113 is configured to distribute fuel to other fuel cell systems located elsewhere in the aircraft. In some embodiments, fuel cell system 106 is configured to receive fuel from other fuel cell systems located elsewhere in the aircraft. In some embodiments, trolleys 110 are equipped with fuel cell system fuel cartridges 303 located on or inside trolleys 110. These cartridges 303 can either directly provide the fuel supply for the fuel cell system 106, or they can be used to refill the fuel storage 113 when the trolleys 110 are connected in stowage.

Figure 3:
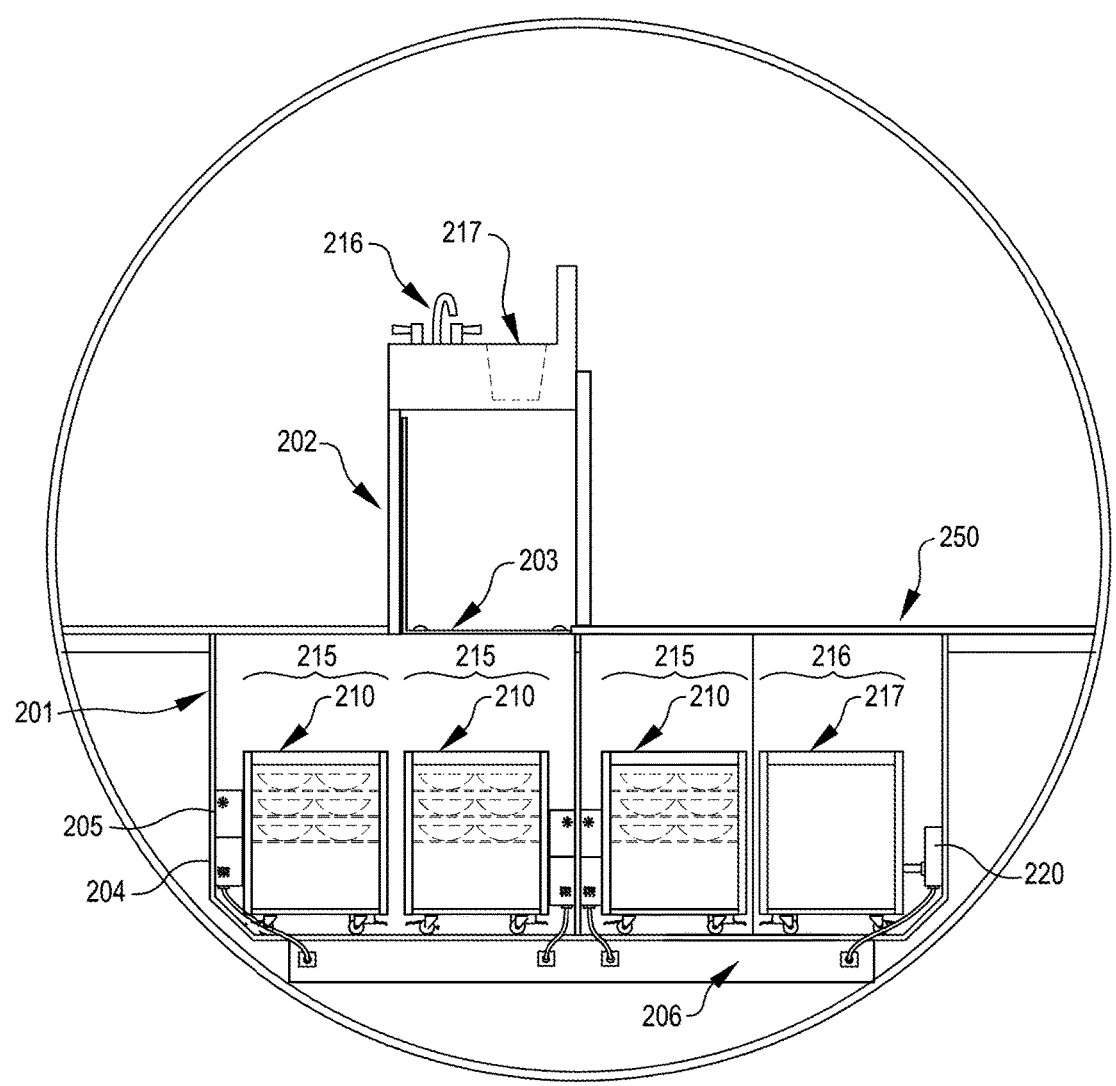
FIG. 3 shows a cargo bay catering container with individual trolley heating and/or cooling and a lifting device to transport the trolleys to the passenger deck in accordance with embodiments.

FIG. 3 shows a cargo bay catering container 201 with individual heating and/or cooling of trolleys 210 and a lifting device 203 to transport the trolleys 210 to the passenger deck 250 in accordance with embodiments. In some embodiments, each trolley 210 may be docked in an individual docking station 215.

Figure 4:
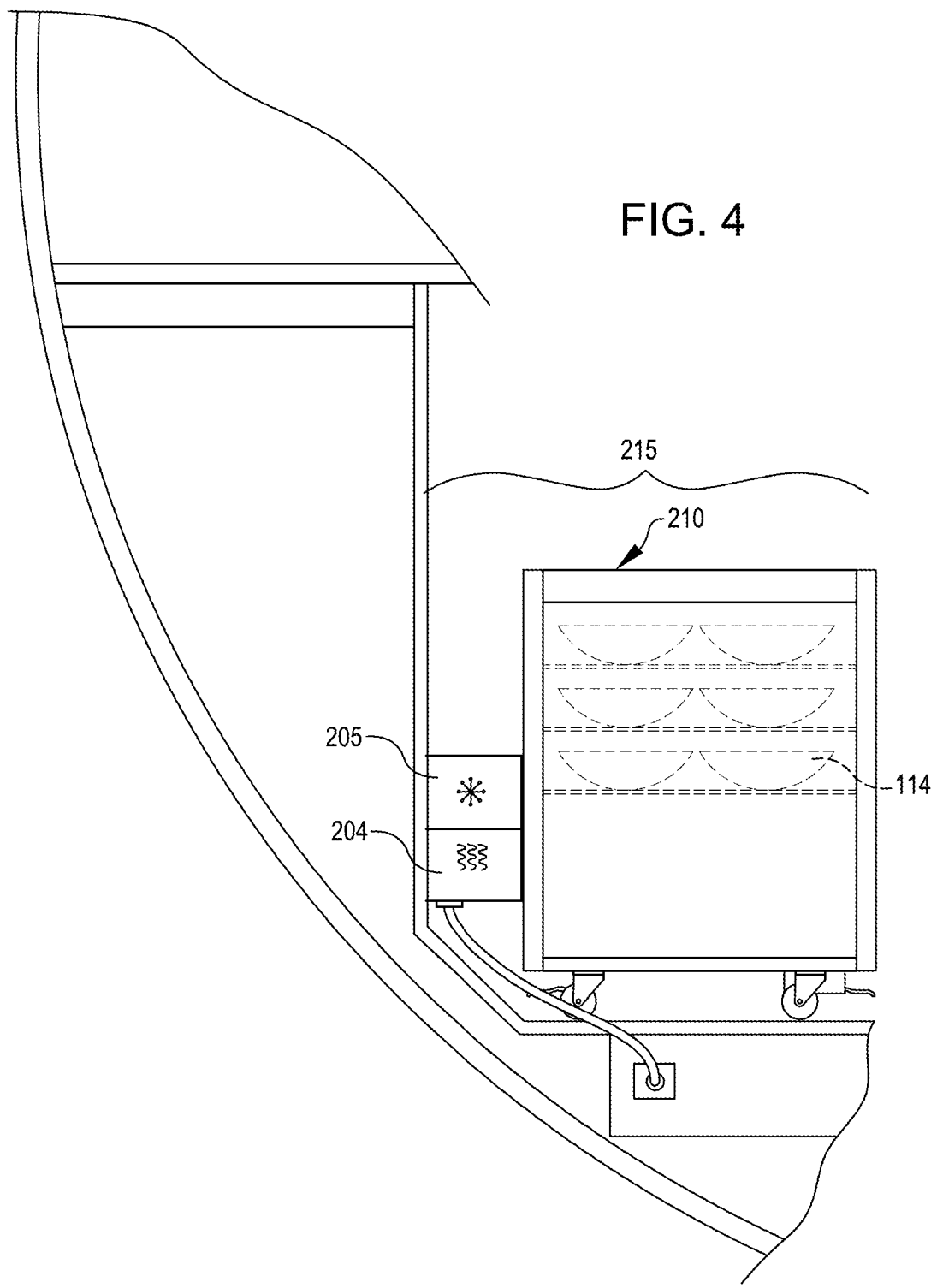
FIG. 4 shows a detail view of a trolley with individual heating and/or cooling of FIG. 3 in accordance with various embodiments.

FIG. 4 shows a detail view of a trolley with individual heating and/or cooling of FIG. 3 in accordance with various embodiments. In some embodiments, each individual docking station 215 has an individual heating module 204 for heating contents 114 of the trolley 210 docked in docking station 215. In some embodiments, each individual docking station 215 has an individual chilling module 205 for chilling contents 114 of the trolley 210 docked in docking station 215.

Referring back to FIG. 3, in embodiments, catering container 201 is powered by a fuel cell system 206. In embodiments, one individual docking station 215 is replaced with fuel docking station 216, which is dedicated for the fuel of the system. In embodiments, the fuel is stored on a fuel trolley 217 of the same size as trolleys 210 but dedicated as fuel storage. In embodiments, trolleys are of a standardized size so that all trolleys 210 are the same size, all fuel trolleys 217 are of the same size, and optionally all fuel trolleys 217 are of the same size as trolleys 210. In embodiments, when fuel trolley 217 is inserted in catering container 201, it is placed in fuel docking station 216 where it is automatically connected to the fuel distribution system 220.

In embodiments, pillar 102 may be configured for various uses in addition to lifting system 103. For example, as shown in FIG. 1, pillar 102 may be equipped a computer 400. The top of pillar 102 may be configured as a welcome desk, for cabin crew to welcome the passengers at boarding and manage any necessary documentation or other check-in procedures. In embodiments, pillar 102 provides storage 115 for objects such as a safety demo kit so as to not consume space in overhead bins. In embodiments, as shown in FIG. 3, pillar 202 has a spigot 216 for cold and/or hot water, where it can be accessed and used by cabin crew and/or passengers. In embodiments, as shown in FIG. 3, pillar 202 has a trash compactor 217 integrated into the pillar.

In embodiments, pillar 102/202 is retractable into catering container 101/201 to provide extra flexibility or space to passenger deck 150/250. In prior art aircraft configurations, the entrance of the aircraft is located near the galley, causing a blockade and delay when passengers enter the aircraft. When this galley is removed, as in various embodiments described herein, entering is easier. To further facilitate entry, in some embodiments, pillar 102/202 can be moved to a lowered position within the catering container 101/201 and covered by an automatically closing hatch in the aircraft floor. In embodiments with retractable pillar 102/202, the entrance to the aircraft may provide a spacious feel to the passengers and speed up the entering of the aircraft. This same floor space can also create a better entering experience for disabled people, particularly if their seating is nearby pillar 102/202.

Most airliners would like to have an aircraft configured for a specific flight, allowing optimization for weight and paying customers. Features of catering containers disclosed in embodiments herein can fulfill this wish of the airliners and contribute to increased flexibility for airliners to change flight routes by installation or removal of catering containers 101/201. For example, in embodiments, a container 101/201 is integrated with a fuel cell system to provide necessary electrical energy, thermal energy, and water production. In embodiments, an additional water tank is installed if more consumption is needed. Such water can be heated, for example, to make coffee, or to supply a water spigot located in the work-deck of pillar 102/202. A retractable pillar 102/202 can be integrated in the catering container 101/202 such that, after installation of the catering container 101/201 in the cargo bay, the pillar 102/202 can be activated to move to a raised position, travelling through the aircraft passenger deck floor to protrude onto the passenger deck. The pillar 102/202 can contain lifting, control, and manual override devices to select options for the stored trolleys. In embodiments, these options can be heating, cooling, selecting, and lifting the stored trolleys. If the aircraft is used for short flights, the catering container 101/201 may be left out completely, resulting in weight savings for that specific flight. In embodiments, empty space in the catering container 101/201 or empty space provided by the absence of catering container 101/201 is used for crew and/or passengers' luggage or any kind of cargo items.

As shown in FIG. 1, in various embodiments, systems in the catering container can be controlled from the passenger deck, such as by computer 400. Computer 400 can be located on pillar 102, or at any other suitable location on the passenger deck 150. Computer 400 can provide a user interface to control catering container systems. In embodiments, passenger preferences (such as special meal request or beverage preference) or flight database can be updated wirelessly.

Figure 5:
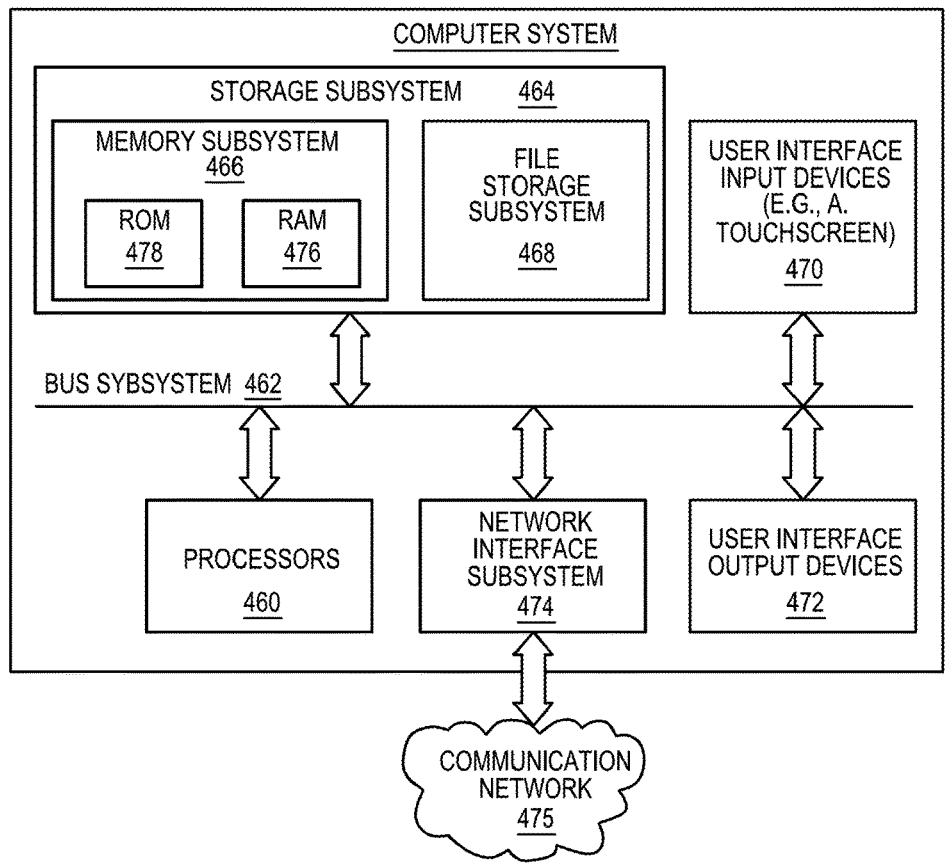
FIG. 5 is a simplified block diagram of an exemplary computer system 400 in accordance with embodiments.

FIG. 5 is a simplified block diagram of an exemplary computer system 400 in accordance with embodiments. The computer system typically includes at least one processor 460 which communicates with a number of peripheral devices via a bus subsystem 462. These peripheral devices may include a storage subsystem 464, comprising a memory subsystem 466 and a file storage subsystem 468, user interface input devices 470, user interface output devices 472, and a network interface subsystem 474. Network interface subsystem 474 provides an interface to a communication network 475 for communication with other systems on board the aircraft, databases, or the like.

The processor 460 performs the operation of the computer systems 400 using execution instructions stored in the memory subsystem 466 in conjunction with any data input from an operator. Such data can, for example, be input through user interface input devices 470, such as the graphical user interface. Thus, processor 460 can include an execution area into which execution instructions are loaded from memory. These execution instructions will then cause processor 460 to send commands to the computer system 400, which in turn control the operation of the container control electronics. Although described as a "processor" in this disclosure and throughout the claims, the functions of the processor may be performed by multiple processors in one computer or distributed over several computers.

User interface input devices 470 may include a keyboard, pointing devices such as a mouse, trackball, touch pad, or graphics tablet, a scanner, foot pedals, a joystick, a touch-screen incorporated into the display, audio input devices such as voice recognition systems, microphones, and other types of input devices. In general, use of the term "input device" is intended to include a variety of conventional and proprietary devices and ways to input information into the computer system. Such input devices will often be used to download a computer executable code from a computer network or a tangible storage media embodying steps or programming instructions for any of the methods of the present invention.

User interface output devices 472 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include a variety of conventional and proprietary devices and ways to output information from the computer system to a user.

Storage subsystem 464 stores the basic programming and data constructs that provide the functionality of the various embodiments. For example, database and modules implementing the functionality of embodiments described herein may be stored in storage subsystem 464. These software modules are generally executed by processor 460. In a distributed environment, the software modules may be stored in a memory of a plurality of computer systems and executed by processors of the plurality of computer systems. Storage subsystem 464 typically comprises memory subsystem 466 and file storage subsystem 468.

Memory subsystem 466 typically includes a number of memories including a main random access memory (RAM) 476 for storage of instructions and data during program execution and a read only memory (ROM) 478 in which fixed instructions are stored. File storage subsystem 468 provides persistent (non-volatile) storage for program and data files, and may include a hard disk drive, re-writable non-volatile memory chips (such as Flash memory), a floppy disk drive along with associated removable media, a Compact Digital Read Only Memory (CD-ROM) drive, an optical drive, DVD, CD-R, CD-RW, or removable media cartridges or disks. One or more of the drives may be located at remote locations on other connected computers at other sites coupled to the computer system. The databases and modules implementing the functionality of the present invention may also be stored by file storage subsystem 468. The file storage subsystem may have directory and file descriptions for accessing the files, or it may store data without descriptions and rely on the databases and modules of the system to locate the data.

Bus subsystem 462 provides a mechanism for letting the various components and subsystems of the computer system communicate with each other as intended. The various subsystems and components of the computer system need not be at the same physical location but may be distributed at various locations within a distributed network. Although bus subsystem 462 is shown schematically as a single bus, alternate embodiments of the bus subsystem may utilize multiple busses.

The computer system 400 itself can be of varying types including a personal computer, a portable computer, a workstation, a computer terminal, a network computer, a module in a circuit board, a mainframe, or any other data processing system. Due to the ever-changing nature of computers and networks, the description of the computer system depicted in FIG. 4 is intended only as a specific example for purposes of illustrating one embodiment. Many other configurations of the computer system are possible having more or less components than the computer system depicted in FIG. 4.

Figure 6:
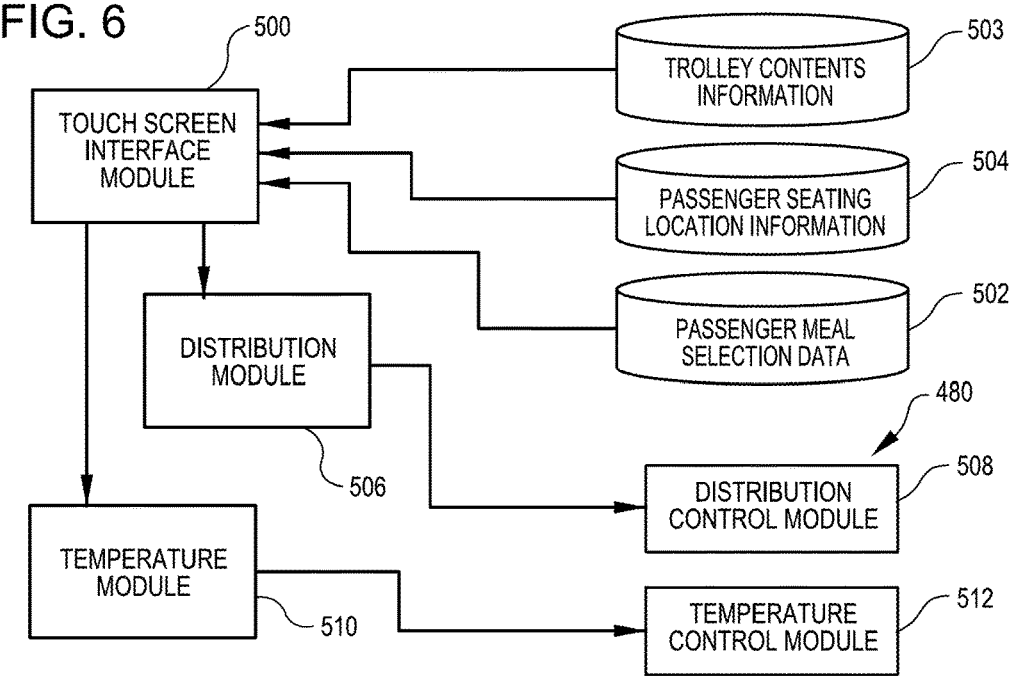
FIG. 6 schematically illustrates a plurality of modules 480 that may carry out embodiments.

FIG. 6 schematically illustrates a plurality of modules 480 that may carry out embodiments. The modules 480 may be software modules, hardware modules, or a combination thereof. If the modules are software modules, the modules will be embodied on a computer readable medium and processed by a processor 460 in any of computer systems of the present invention.

A first module is a touch screen interface module 500. The touch screen interface module receives data from the touch screen, e.g., the user interface input device 470, as described above. In addition, the touch screen interface module may be configured to receive passenger meal selection data 502, trolley contents information 504 and/or passenger seating location information 504.

Information from the touch screen interface module is forwarded to a distribution module 506. The distribution module 506 generates distribution information and forwards that information to a distribution control module 508, which in turn controls the distribution system electronics for the device. Information from the touch screen interface module is forwarded to a temperature module 510. The temperature module 510 generates temperature information and forwards that information to a temperature control module 512, which in turn controls the temperature adjustment electronics for the device.

The modules 480 are designed so that an operator may enter information into a touch screen interface, which is in turn received by the touch screen interface module 500. The touch screen can detect menu selections and freehand drawings or other contact made with the touch screen made using either a stylus or a finger of the user.

Figure 7:
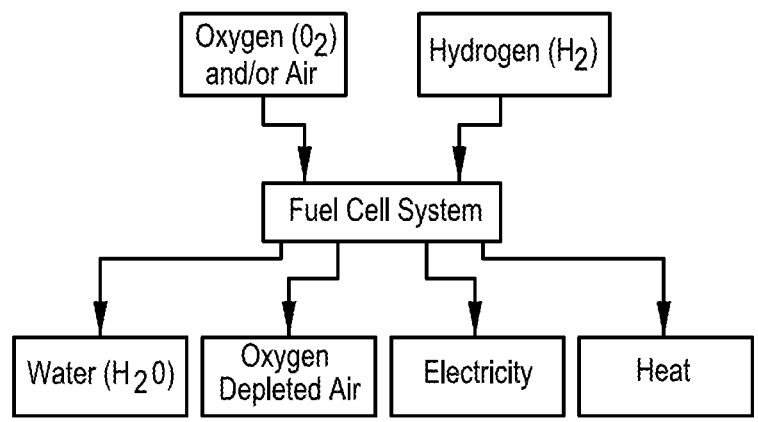
FIG. 7 shows a schematic example of input and output elements in connection with a fuel cell.

FIG. 7 shows a schematic example of input elements that may be used for a fuel cell, showing the materials needed to generate power (O2 and H2) and the output elements (H2O, oxygen depleted air (ODA), and heat) that may be reused by the catering container functions described here, as well as additional aircraft components.

As one of the main components, a fuel cell system usually includes a fuel cell for combining the fuel source with the oxidant. However, several other components are often found in fuel cell systems, including at least one hydrogen circuit, oxygen and/or air circuit, electricity energy storage circuit, and power management circuit. A fuel cell system may (or may not) include a battery. If included, the system is a hybridized fuel cell system. Furthermore, fuel cell systems are often characterized according to type, whether that be PEMFC (Proton Exhange Membrane), SOFC (Solid Oxide), MCFC (Molten Carbonate), DMFC (Direct Methanol), AFC (Alkaline), PAFC (Phosphoric Acid) or some other newer fuel cell system technology comprising hybride solution.

Fuel sources for fuel cell systems may be different forms of hydrogen (gas, liquid, solid). Furthermore, fuel sources may be compounds other than hydrogen which generate, or can be processed to generate, the necessary hydrogen for fuel (compounds such as hydrocarbons, ammonia, etc.). The supply of oxygen is referred to as the oxidant, and it may be supplied in the form of common air, oxygen enriched air, or pure oxygen. On an airplane, the oxidant could be stored in a gas bottle, be generated onboard, or, in the case of regular air, come from the air in the atmosphere.

Figure 8:
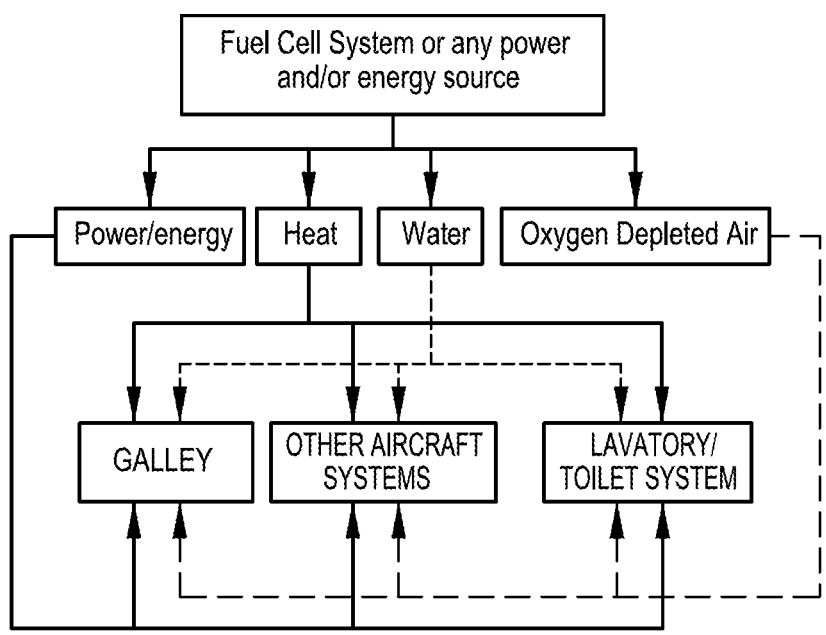
FIG. 8 shows a schematic of how fuel cells may be used to power aircraft systems.

FIG. 8 shows an example of how fuel cells may be used in connection with various aircraft components in order to provide power to those components, as well as to provide alternatives for using the fuel cell by-products for various components.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus for storing and retrieving service trolleys in a craft having a passenger deck and a cargo bay, the apparatus comprising:
    a container which can be located in the cargo bay, the container configured to hold at least one service trolley;
    a pillar which can be located on the passenger deck, the pillar comprising an opening configured to receive at least one service trolley from the passenger deck when the pillar is located on the passenger deck;
    a lift configured to move the at least one service trolley between the container and the opening of the pillar; and
    a power source configurable to operate independently of other power sources on the craft, wherein the power source is a fuel cell system and wherein electricity from the fuel cell system is used for powering a trolley distribution system and wherein at least one by-product from the fuel cell system other than electricity is used for heating or cooling at least one of the service trolleys.

2. The apparatus for storing and retrieving service trolleys of claim 1, further comprising a distribution system configured for selecting at least one trolley from a plurality of trolleys located in the container and operable to orient the selected at least one trolley for movement by the lift from the container to the pillar.

3. The apparatus for storing and retrieving service trolleys of claim 2, wherein the distribution system is further operable to control the lift.

4. The apparatus for storing and retrieving service trolleys of claim 2, wherein the distribution system comprises a computer, the computer comprising a processor and a computer readable medium comprising instructions executable by the processor, the instructions comprising a distribution module, the instructions executable by the processor for selecting at least one trolley from a plurality of trolleys located in the container and orienting the selected at least one trolley for movement by the lift from the container to the pillar.

5. The apparatus for storing and retrieving service trolleys of claim 4, wherein the instructions are further executable by the processor for selecting a sequence for retrieving a subset of the plurality of trolleys based at least in part on a set of meal allocations for a set of passengers and a set of seat assignments for the set of passengers.

6. The apparatus for storing and retrieving service trolleys of claim 1, wherein the container comprises at least one of a heating compartment for storing trolleys containing contents to be heated, a cooling compartment for storing trolleys containing contents to be cooled, a dry compartment for storing trolleys containing contents to be kept dry, or a fuel compartment for storing fuel for a power source of the apparatus, wherein the heating compartment comprises at least one heating module configurable for heating contents of at least one trolley and the cooling compartment comprises at least one cooling module configurable for cooling contents of at least one trolley.

7. The apparatus for storing and retrieving service trolleys of claim 1, wherein the power source is at least one of a fuel cell system, a battery system, or a power system of the craft.

8. The apparatus for storing and retrieving service trolleys of claim 1, wherein the fuel cell system produces heat or water or both to be used in the catering purposes of the at least one trolley.

9. The apparatus for storing and retrieving service trolleys of claim 1, wherein the container further comprises fuel storage for the fuel cell system.

10. The apparatus for storing and retrieving service trolleys of claim 9, wherein fuel storage for the fuel cell system is configured to distribute fuel to other fuel cell systems in the craft.

11. The apparatus for storing and retrieving service trolleys of claim 1, wherein the container is configured so that at least one trolley having at least one fuel cartridge can be connected to refill the fuel storage for the fuel cell system from the at least one fuel cartridge when the at least one trolley is in stowage.

12. The apparatus for storing and retrieving service trolleys of claim 11, further comprising at least one trolley having at least one fuel cartridge connectable to refill the fuel storage for the fuel cell system when the at least one trolley is in stowage.

13. The apparatus for storing and retrieving service trolleys of claim 1, wherein the pillar comprises at least one of a work-desk, a spigot, a sink, a trash compactor, or storage for safety demonstration gear.

14. The apparatus for storing and retrieving service trolleys of claim 1, wherein the container is configurable for removal from the cargo bay between voyages of the craft.

15. The apparatus for storing and retrieving service trolleys of claim 14, wherein the container comprises the pillar and the lift, and the pillar is configurable for retraction from the passenger deck into the container for removal of the container between voyages.

16. The apparatus for storing and retrieving service trolleys of claim 1, wherein the container comprises at least one trolley storing position, each trolley storing position configured to receive a trolley and to at least one of:
provide power to at least one of a heating module for heating contents of the trolley or a cooling module for cooling contents of the trolley; or
recharge a power source operable to power at least one of a heating module for heating contents of the trolley or a cooling module for cooling contents of the trolley.

* * * * *